United States Patent
Heo et al.

(10) Patent No.: US 10,483,561 B2
(45) Date of Patent: Nov. 19, 2019

(54) FLAT PLATE-SHAPED SOLID OXIDE FUEL CELL AND CELL MODULE COMPRISING SAME

(71) Applicant: LG CHEM, LTD., Seoul (KR)

(72) Inventors: Yeonhyuk Heo, Daejeon (KR); Kwangwook Choi, Daejeon (KR); Sanghyeok Im, Daejeon (KR); Takkeun Oh, Daejeon (KR); Jeong Mi Choi, Daejeon (KR); Tai Min Noh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 149 days.

(21) Appl. No.: 15/578,415

(22) PCT Filed: Jul. 27, 2016

(86) PCT No.: PCT/KR2016/008217
§ 371 (c)(1),
(2) Date: Nov. 30, 2017

(87) PCT Pub. No.: WO2017/034163
PCT Pub. Date: Mar. 2, 2017

(65) Prior Publication Data
US 2018/0219234 A1    Aug. 2, 2018

(30) Foreign Application Priority Data
Aug. 27, 2015  (KR) .......................... 10-2015-0121179

(51) Int. Cl.
*H01M 8/0271*    (2016.01)
*H01M 8/1253*    (2016.01)
(Continued)

(52) U.S. Cl.
CPC ....... *H01M 8/0271* (2013.01); *H01M 8/0206* (2013.01); *H01M 8/1253* (2013.01);
(Continued)

(58) Field of Classification Search
CPC . H01M 2008/1293; H01M 2300/0077; H01M 8/00; H01M 8/0206; H01M 8/0271;
(Continued)

(56) References Cited

U.S. PATENT DOCUMENTS

| 2010/0098996 A1 | 4/2010 | Hwang et al. |
| 2013/0040223 A1 | 2/2013 | Tsukamoto et al. |
| 2013/0230791 A1* | 9/2013 | Chang ................. H01M 8/0232 429/495 |

FOREIGN PATENT DOCUMENTS

| EP | 1317011 A2 | 6/2003 |
| EP | 2814099 A1 | 12/2014 |

(Continued)

OTHER PUBLICATIONS

Extended European Search Report for European Patent No. 16839453.4, dated Jan. 3, 2019.
(Continued)

*Primary Examiner* — Carlos Barcena
(74) *Attorney, Agent, or Firm* — Birch, Stewart, Kolasch & Birch, LLP

(57) ABSTRACT

A flat plate-shaped solid oxide fuel cell having a porous ceramic support, a fuel electrode provided on the porous ceramic support, an electrolyte layer provided on the fuel electrode, an air electrode provided on the electrolyte layer, and a fuel electrode current collector connected to the fuel electrode and extending in a direction way from the air electrode is provided.

9 Claims, 7 Drawing Sheets

(51) Int. Cl.
  *H01M 8/2432* (2016.01)
  *H01M 8/0206* (2016.01)
  *H01M 8/124* (2016.01)
(52) U.S. Cl.
  CPC .. *H01M 8/2432* (2016.02); *H01M 2008/1293* (2013.01); *H01M 2300/0077* (2013.01)
(58) Field of Classification Search
  CPC ............ H01M 8/1246; H01M 8/1253; H01M 8/2432; H01M 8/249; Y02E 60/525; Y02P 70/56
  See application file for complete search history.

(56) References Cited

FOREIGN PATENT DOCUMENTS

| | | |
|---|---|---|
| EP | 2882020 A1 | 6/2015 |
| JP | 2005-135713 A | 5/2005 |
| JP | 5502615 B2 | 5/2014 |
| JP | 2015-144114 A | 8/2015 |
| KR | 10-2003-0045324 A | 6/2003 |
| KR | 10-2011-0047849 A | 5/2011 |
| KR | 10-2011-0056574 A | 5/2011 |
| KR | 10-2012-0075244 A | 7/2012 |
| KR | 10-2012-0075257 A | 7/2012 |
| WO | WO 2014/021446 A | 2/2014 |

OTHER PUBLICATIONS

International Search Report issued in PCT/KR2016/008217 (PCT/ISA/210), dated Nov. 1, 2016.

* cited by examiner

[FIG. 1]
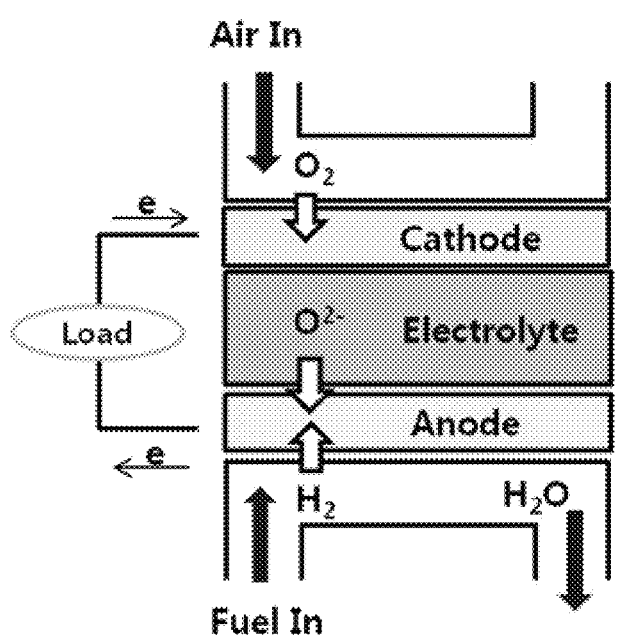

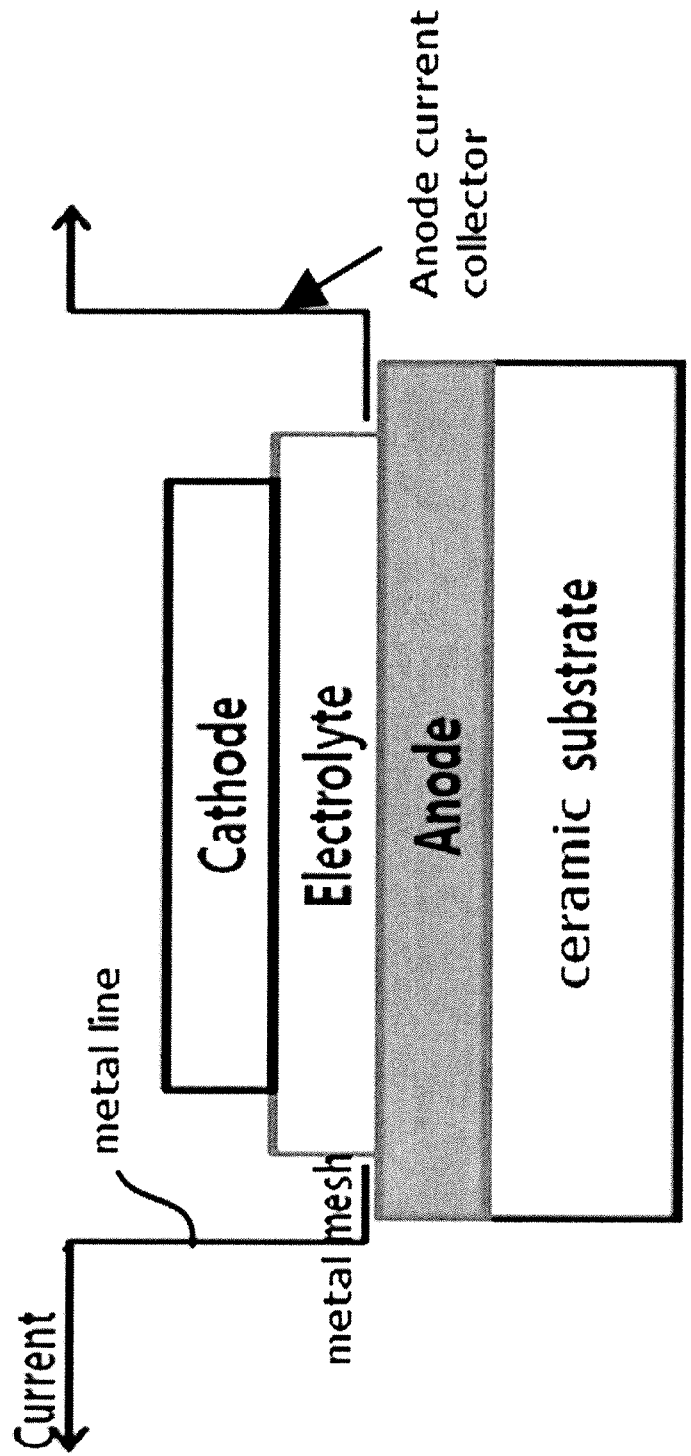
[FIG. 2]

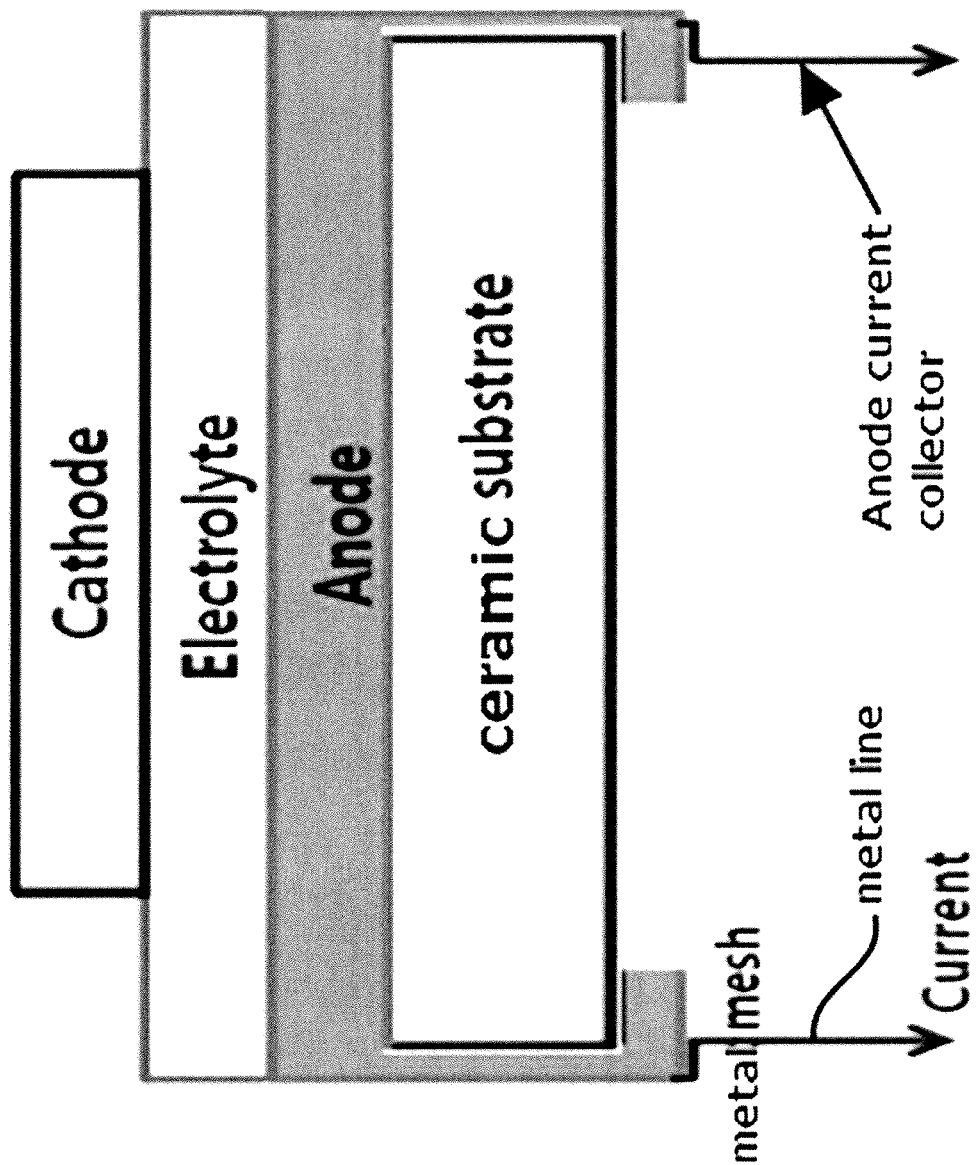
[FIG. 3]

[FIG. 4]
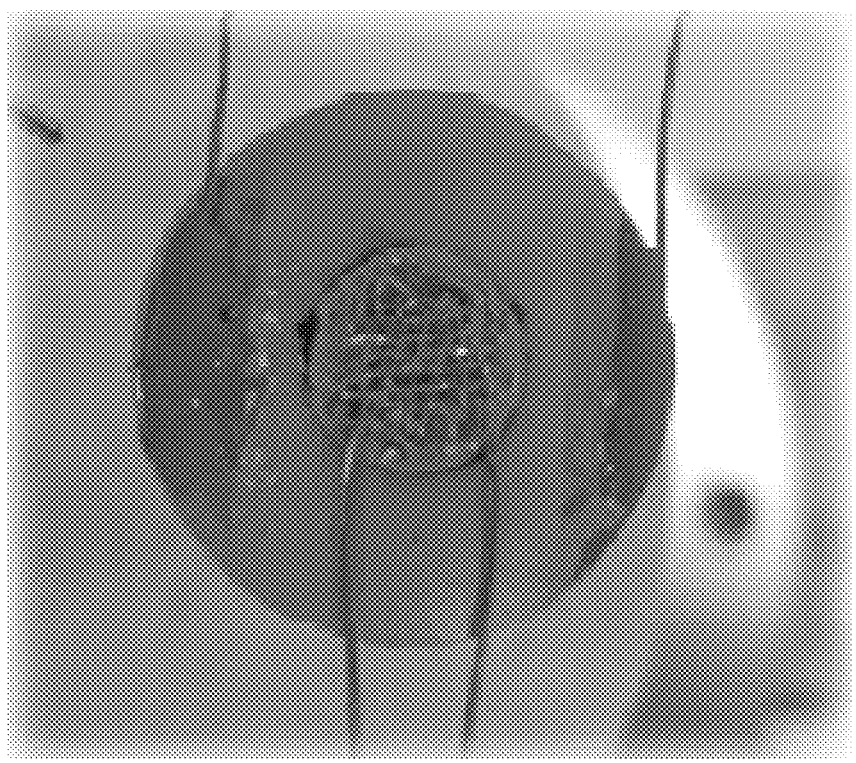

[FIG. 5]
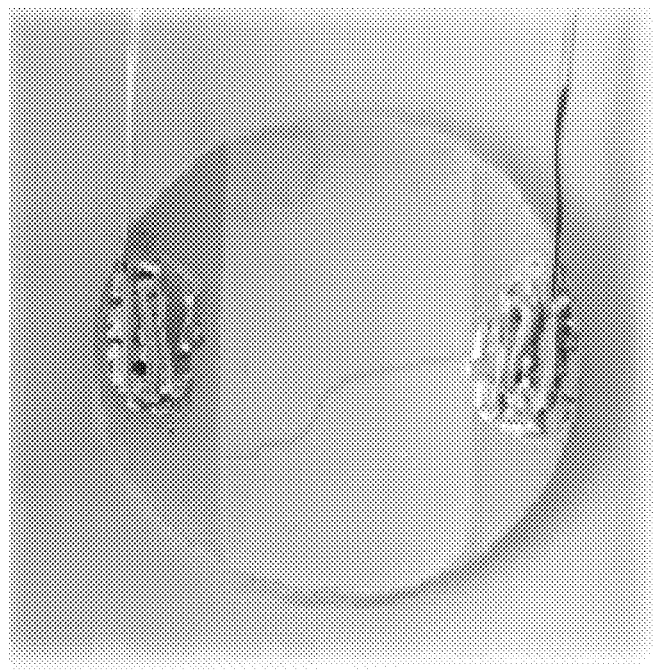
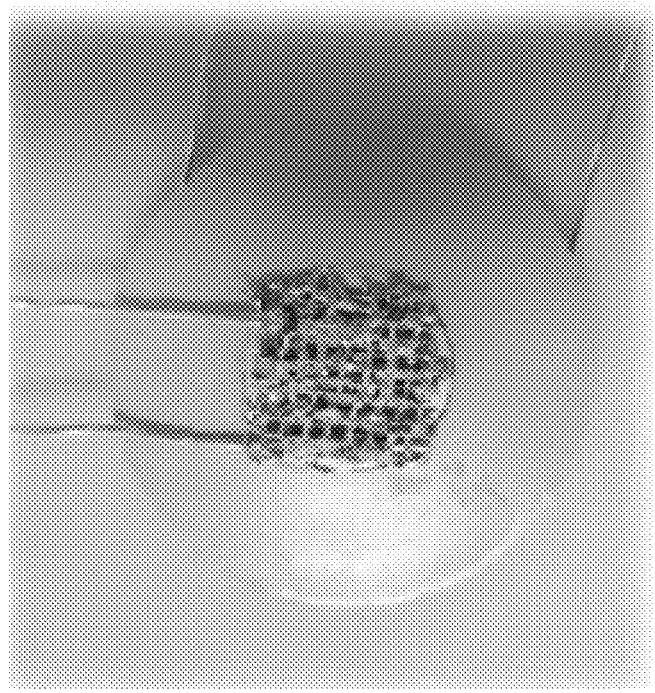

[FIG. 6]
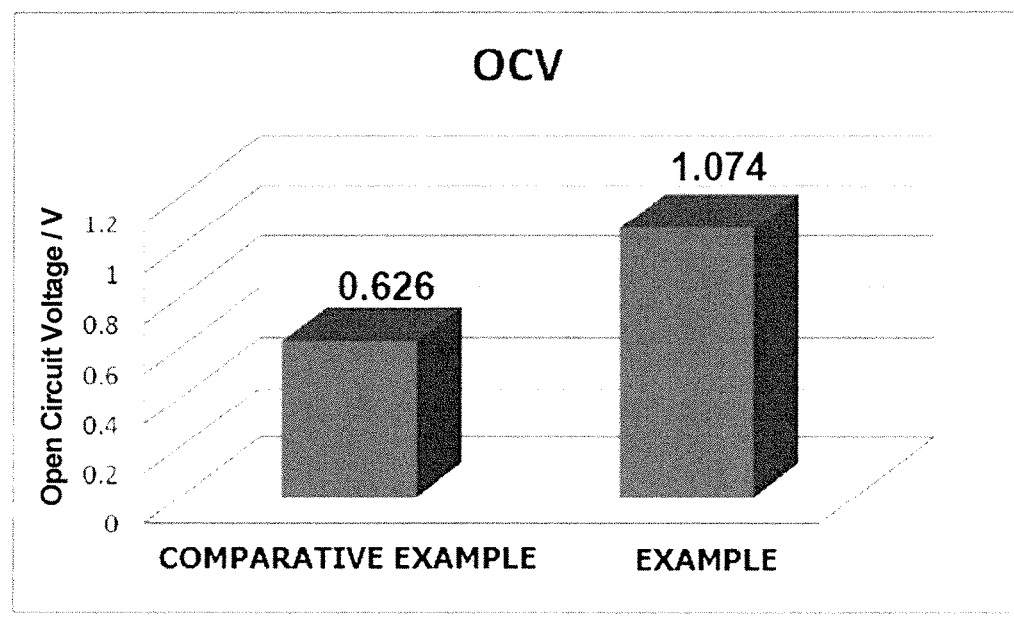

[FIG. 7]
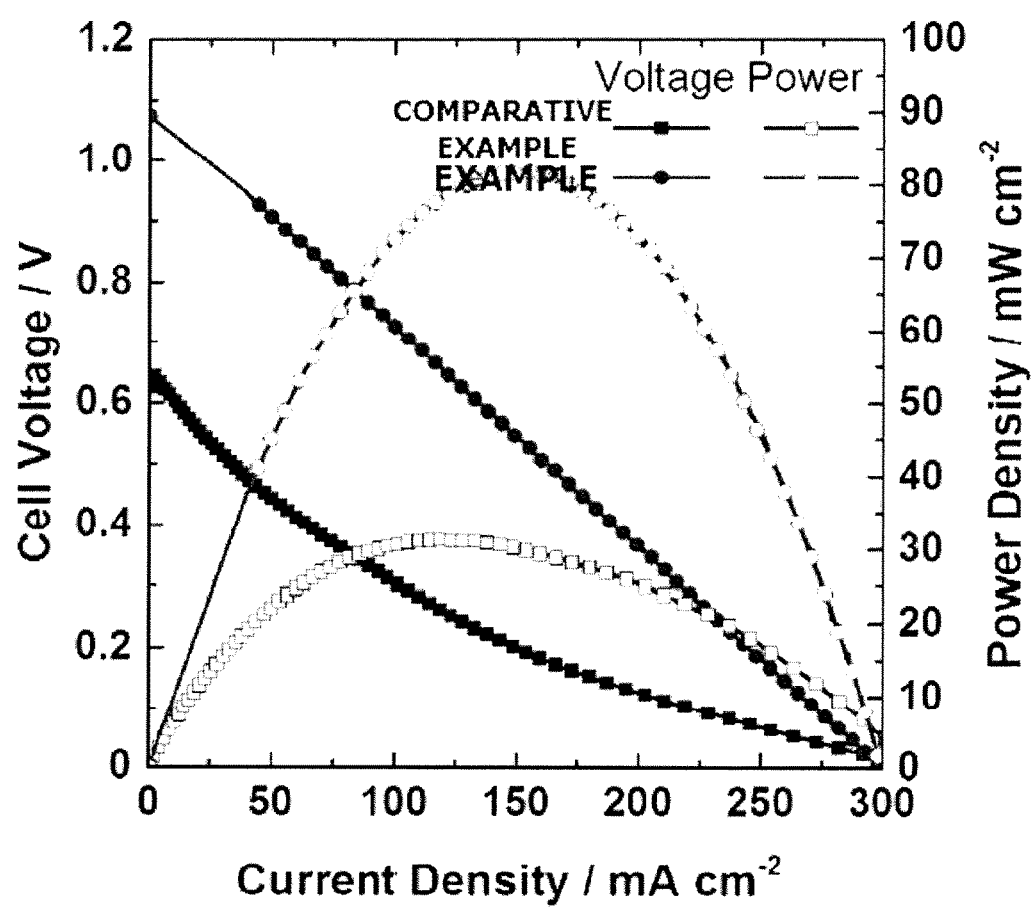

FLAT PLATE-SHAPED SOLID OXIDE FUEL CELL AND CELL MODULE COMPRISING SAME

TECHNICAL FIELD

This application claims priority to and the benefits of Korean Patent Application No. 10-2015-0121179, filed with the Korean Intellectual Property Office on Aug. 27, 2015, the entire contents of which are incorporated herein by reference.

The present specification relates to a flat plate-shaped solid oxide fuel cell. Specifically, the present specification relates to a flat plate-shaped solid oxide fuel cell consecutively provided with a fuel electrode, an electrolyte layer and an air electrode.

BACKGROUND ART

With recent predictions about the exhaustion of existing energy resources such as petroleum and coal, interests in alternative energy capable of replacing these have been growing. As one of such alternative energy, fuel cells have received attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte membrane-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like.

FIG. 1 is a diagram schematically showing a principle of electricity generation of a solid oxide-type fuel cell, and a solid oxide-type fuel cell is formed with an electrolyte layer, and fuel electrode (anode) and an air electrode (cathode) formed on both surfaces of this electrolyte layer. When referring to FIG. 1 showing a principle of electricity generation of a solid oxide-type fuel cell, air is electrochemically reduced in an air electrode to produce oxygen ions, and the produced oxygen ions are transferred to a fuel electrode through an electrolyte layer. In the fuel electrode, fuel such as hydrogen, methanol and butane is injected, and the fuel releases electrons while bonding to the oxygen ions and electrochemically oxidized to produce water. Through such a reaction, electrons migrate to an external circuit.

DISCLOSURE

Technical Problem

The present specification is directed to providing a flat plate-shaped solid oxide fuel cell. Specifically, the present specification is directed to providing a flat plate-shaped solid oxide fuel cell consecutively provided with a fuel electrode, an electrolyte layer and an air electrode.

Technical Solution

One embodiment of the present specification provides a flat plate-shaped solid oxide fuel cell including a porous ceramic support, a fuel electrode provided on the porous ceramic support, an electrolyte layer provided on the fuel electrode, an air electrode provided on the electrolyte layer, and a fuel electrode current collector connected to the fuel electrode and provided while being extended in a direction opposite to a direction provided with the air electrode based on the porous ceramic support.

Another embodiment of the present specification provides a cell module including a flat plate-shaped solid oxide fuel cell as a unit cell.

Advantageous Effects

A solid oxide fuel cell having a porous ceramic support manufactured according to the present specification has an advantage of stably sealing a gas.

A flat plate-shaped solid oxide fuel cell having a porous ceramic support manufactured according to the present specification can have a high open circuit voltage.

A flat plate-shaped solid oxide fuel cell having a porous ceramic support manufactured according to the present specification has increased cell efficiency.

A flat plate-shaped solid oxide fuel cell having a porous ceramic support manufactured according to the present specification has high long-term stability.

A flat plate-shaped solid oxide fuel cell having a porous ceramic support manufactured according to the present specification can use low-priced materials for a fuel electrode current collector, and therefore, the costs can be reduced.

DESCRIPTION OF DRAWINGS

FIG. 1 is a schematic diagram showing a principle of electricity generation of a solid oxide fuel cell (SOFC).

FIG. 2 is a structural diagram showing a location of a fuel electrode current collector of a comparative example.

FIG. 3 is a structural diagram showing a location of a fuel electrode current collector of an example.

FIG. 4 is an image of a coin cell of a comparative example photographed from an air electrode side.

FIG. 5 is images of a coin cell of an example photographed from an air electrode side (left) and a fuel electrode side (right).

FIG. 6 is a graph showing an open circuit voltage depending on a temperature in an example and a comparative example.

FIG. 7 is a graph showing I-V-P curves in an example and a comparative example.

MODE FOR DISCLOSURE

Hereinafter, the present specification will be described in detail.

One embodiment of the present specification provides a flat plate-shaped solid oxide fuel cell consecutively provided with a porous ceramic support, a fuel electrode, an electrolyte layer and an air electrode.

The porous ceramic support refers to a layer supporting other layers of the flat plate-shaped solid oxide fuel cell with its relatively higher thickness compared to the other layers.

The porous ceramic support is provided on the fuel electrode side, and therefore, is preferably porous so as to inject fuel to the fuel electrode.

The porous ceramic support may have porosity of 20% or more and 60% or less. Specifically, the porous ceramic support may have porosity of 30% or more and 50% or less.

The porous ceramic support may have a pore diameter of 0.1 μm or more and 10 μm or less. Specifically, the porous ceramic support may have a pore diameter of 0.5 μm or more and 5 μm or less. More specifically, the porous ceramic support may have a pore diameter of 0.5 μm or more and 2 μm or less.

The porous ceramic support is made of ceramics that may not function as a fuel electrode since ceramics do not have oxygen ion conductivity and electrical conductivity, or even when having oxygen ion conductivity and electrical conductivity, the oxygen ion conductivity and the electrical conductivity do not satisfy levels required as a fuel electrode, however, the material may be low-priced.

The porous ceramic support may include at least one oxide of Mg, Ca, Y, Al and Zr. The porous ceramic support may include at least one oxide of MgO, $MgAl_2O_4$, CaO, $Y_2O_3$, $Al_2O_3$ and $Zr_2O_3$.

The porous ceramic support may have a thickness of 200 μm or more and 5 mm or less. This has advantages in that reactants and products are smoothly transferred during cell driving, and required mechanical strength is maintained.

Specifically, the porous ceramic support may have a thickness of 500 μm or more and 2 mm or less.

A method for preparing the porous ceramic support is not particularly limited, and slurry for the porous ceramic support may be coated on a substrate, and the result may be dried and sintered. Specifically, a green sheet for the porous ceramic support is prepared by coating slurry for the porous ceramic support on a substrate and drying the result, and the green sheet is moved, laminated and separately baked, or baked together with green sheets of other layers.

The green sheet for a porous ceramic support may have a thickness of 400 μm or more and 1500 μm or less.

The flat plate-shaped solid oxide fuel cell further includes a fuel electrode current collector connected to the fuel electrode, and provided while being extended in a direction opposite to a direction provided with the air electrode based on the porous ceramic support.

The fuel electrode provided between the porous ceramic support and the electrolyte layer may be connected to the fuel electrode current collector. Specifically, the fuel electrode provided between the porous ceramic support and the electrolyte layer may be connected to the fuel electrode current collector provided while being extended in a direction opposite to a direction provided with the air electrode based on the porous ceramic support.

At least a part of an edge part of the fuel electrode provided between the porous ceramic support and the electrolyte layer is provided while being extended to a surface of the porous ceramic support in a direction opposite to a direction provided with the air electrode based on the porous ceramic support, and the fuel electrode current collector and the part of the fuel electrode provided while being extended to a surface of the porous ceramic support in a direction opposite to a direction provided with the air electrode based on the porous ceramic support may be connected.

The fuel electrode current collector may include a metal mesh layer provided on a part of the fuel electrode provided while being extended to a surface of the porous ceramic support in a direction opposite to a direction provided with the air electrode based on the porous ceramic support, and an extension line connected to the metal mesh layer and provided while being extended in a direction opposite to a direction provided with the air electrode based on the porous ceramic support.

The fuel electrode current collector may include two or more metal mesh layers provided on a part of the fuel electrode provided while being extended to a surface of the porous ceramic support in a direction opposite to a direction provided with the air electrode based on the porous ceramic support and separated from each other, and two or more extension lines each connected to the two or more metal mesh layers and provided while being extended in a direction opposite to a direction provided with the air electrode based on the porous ceramic support.

The direction provided with the two or more extension lines of the fuel electrode may be a direction of supplying fuel of the fuel electrode, and in other words, the direction provided with the two or more extension lines of the fuel electrode means a direction in which the two or more extension lines of the fuel electrode are exposed to fuel but are not exposed to air supplied to the air electrode.

The direction provided with the two or more extension lines of the fuel electrode may be extended in a direction opposite to a direction provided with the air electrode based on the porous ceramic support. Herein, the direction provided with the two or more extension lines of the fuel electrode may include a direction having a 0° degree with respect to a surface opposite to a surface of the porous ceramic support provided with the electrolyte layer. Specifically, the direction provided with the two or more extension lines of the fuel electrode may be a direction parallel to a surface opposite to a surface of the porous ceramic support provided with the electrolyte layer, a direction perpendicular to a surface opposite to a surface of the porous ceramic support provided with the electrolyte layer in a direction opposite to a direction provided with the air electrode based on the porous ceramic support, or a direction forming an acute angle to a surface opposite to a surface of the porous ceramic support provided with the electrolyte layer.

The fuel electrode may include a first inorganic substance having oxygen ion conductivity so as to be used in a fuel electrode for a solid oxide fuel cell, and although types of the first inorganic substance are not particularly limited, the first inorganic substance may include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15), samarium doped ceria (SDC: $(Sm_2O_3)_x(CeO_2)_{1-x}$, x=0.02 to 0.4), gadolinium doped ceria (GDC: $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The fuel electrode current collector may include at least one of nickel, copper, platinum, silver and palladium. Specifically, the fuel electrode current collector may include nickel or copper.

The fuel electrode may have a thickness of 10 μm or more and 100 μm or less. Specifically, the fuel electrode may have a thickness of 20 μm or more and 50 μm or less.

The fuel electrode may have porosity of 10% or more and 50% or less. Specifically, the fuel electrode may have porosity of 10% or more and 30% or less.

The fuel electrode may have a pore diameter of 0.1 μm or more and 10 μm or less. Specifically, the fuel electrode may have a pore diameter of 0.5 μm or more and 5 μm or less. More specifically, the fuel electrode may have a pore diameter of 0.5 μm or more and 2 μm or less.

A method for preparing the fuel electrode is not particularly limited, and for example, slurry for a fuel electrode is coated on a cured porous ceramic support, and the result is dried and cured, or, a green sheet for a fuel electrode may be prepared by coating fuel electrode slurry on a separate release paper and drying the result, and the prepared green sheet for a fuel electrode may be laminated on a cured porous ceramic support and then cured to prepare the fuel electrode.

The green sheet for a fuel electrode may have a thickness of 10 μm or more and 100 μm or less.

The slurry for a fuel electrode includes first inorganic particles having oxygen ion conductivity, and as necessary, the slurry for a fuel electrode may further include a binder resin, a plasticizer, a dispersant and a solvent. The binder resin, the plasticizer, the dispersant and the solvent are not particularly limited, and common materials known in the art may be used.

The slurry for a fuel electrode may further include NiO.

In the present specification, the green sheet means a film-type membrane in a state capable of being processed in a next step rather than a complete final product. In other words, the green sheet is coating with a coating composition including inorganic particles and a solvent, and drying to a sheet-type, and the green sheet refers to a sheet in a semi-dried state capable of maintaining a sheet form while including some solvent.

The electrolyte layer may include a second inorganic substance having oxygen ion conductivity, and although types of the second inorganic substance are not particularly limited, the second inorganic substance may include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15), samarium doped ceria (SDC: $(Sm_2O_3)_x(CeO_2)_{1-x}$, x=0.02 to 0.4), gadolinium doped ceria (GDC: $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The second inorganic substance of the electrolyte layer may be the same as the first inorganic substance of the fuel electrode.

The electrolyte layer may have a thickness of 3 μm or more and 30 μm or less. Specifically, the electrolyte layer may have a thickness of 3 μm or more and 10 μm or less.

A method for preparing the electrolyte layer is not particularly limited, and for example, slurry for a electrolyte layer is coated on a sintered fuel electrode or a green sheet for a fuel electrode, and the result is dried and cured, or, a green sheet for an electrolyte layer is prepared by coating slurry for an electrolyte layer on a separate release paper and drying the result, and the prepared green sheet for an electrolyte layer is laminated on a sintered fuel electrode or a green sheet for a fuel electrode and then cured to prepare the electrolyte layer.

The green sheet for an electrolyte layer may have a thickness of 5 μm or more and 30 μm or less.

The slurry for an electrolyte layer includes second inorganic particles having oxygen ion conductivity, and as necessary, the slurry for an electrolyte layer may further include a binder resin, a plasticizer, a dispersant and a solvent. The binder resin, the plasticizer, the dispersant and the solvent are not particularly limited, and common materials known in the art may be used.

The flat plate-shaped solid oxide fuel cell may include an air electrode provided on an electrolyte layer, and an air electrode current collector connected to the air electrode and provided while being extended in a direction opposite to a direction provided with the electrolyte layer based on the air electrode.

The air electrode current collector may include a metal mesh layer provided on at least a part of the air electrode, and an extension line connected to the metal mesh layer and provided while being extended in a direction opposite to a direction provided with the electrolyte layer based on the air electrode.

The air electrode current collector may include two or more metal mesh layers provided on at least a part of the air electrode and separated from each other, and two or more extension lines each connected to the two or more metal mesh layers and provided while being extended in a direction opposite to a direction provided with the electrolyte layer based on the air electrode.

The direction provided with the two or more extension lines of the air electrode may be a direction of supplying air of the air electrode, and in other words, the direction provided with the two or more extension lines of the air electrode means a direction in which the two or more extension lines of the air electrode are exposed to air but are not exposed to fuel supplied to the fuel electrode.

The direction provided with the two or more extension lines of the air electrode may be extended in a direction opposite to a direction provided with the electrolyte layer based on the air electrode. Herein, the direction provided with the two or more extension lines of the air electrode may include a direction having a 0° degree with respect to a surface opposite to a surface of the air electrode provided with the electrolyte layer. Specifically, the direction provided with the two or more extension lines of the air electrode may be a direction parallel to a surface opposite to a surface of the air electrode provided with the electrolyte layer, a direction perpendicular to a direction opposite to a surface opposite to a surface of the air electrode provided with the electrolyte layer in a direction provided with the electrolyte layer based on the air electrode, or a direction forming an acute angle to a surface opposite to a surface of the air electrode provided with the electrolyte layer.

The air electrode may include a third inorganic substance having oxygen ion conductivity so as to be used in an air electrode for a solid oxide fuel cell, and although types of the third inorganic substance are not particularly limited, the third inorganic substance may include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15), samarium doped ceria (SDC: $(Sm_2O_3)_x(CeO_2)_{1-x}$, x=0.02 to 0.4), gadolinium doped ceria (GDC: $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The air electrode current collector may include at least one of platinum (Pt), silver (Ag), silver-palladium (Ag—Pd), lanthanum strontium manganite (LSM) and lanthanum strontium manganite-silver (LSM-Ag).

The air electrode may have a thickness of 10 μm or more and 100 μm or less. Specifically, the air electrode may have a thickness of 20 μm or more and 50 μm or less.

The air electrode may have porosity of 10% or more and 50% or less. Specifically, the air electrode may have porosity of 20% or more and 40% or less.

The air electrode may have a pore diameter of 0.1 μm or more and 10 μm or less. Specifically, the air electrode may have a pore diameter of 0.5 μm or more and 5 μm or less. More specifically, the air electrode may have a pore diameter of 0.5 μm or more and 2 μm or less.

A method for forming the air electrode is not particularly limited, and for example, slurry for a air electrode is coated on a sintered electrolyte layer, and the result is dried and cured, or, a green sheet for an air electrode is prepared by coating air electrode slurry on a separate release paper and drying the result, and the prepared green sheet for an air electrode is laminated on a sintered electrolyte layer and then cured to prepare the air electrode.

The green sheet for an air electrode may have a thickness of 10 μm or more and 100 μm or less.

The slurry for an air electrode includes third inorganic particles having oxygen ion conductivity, and as necessary, the slurry for an air electrode may further include a binder resin, a plasticizer, a dispersant and a solvent. The binder resin, the plasticizer, the dispersant and the solvent are not particularly limited, and common materials known in the art may be used.

In the flat plate-shaped solid oxide fuel cell having a porous ceramic support, the porous ceramic support locating on the outside of the fuel electrode has no or low oxygen ion conductivity and electrical conductivity, and therefore, current collecting of the fuel electrode needs to be carried out through a current collector directly connected to the fuel electrode provided between the porous ceramic support and the electrolyte layer.

For this, a metal mesh pattern for current collecting needs to be formed on the fuel electrode, however, this has a disadvantage in that, when forming a metal mesh pattern of the current collector is formed on a surface where the fuel electrode and the electrolyte layer need to be in contact with each other, the contact area between the fuel electrode and the electrolyte layer relatively decreases, and adhesion at an interface between the fuel electrode and the electrolyte layer is not stable making stable gas sealing difficult.

Meanwhile, a metal mesh pattern may be formed on the fuel electrode exposed by forming the electrolyte layer smaller than the fuel electrode, however, in such a case, there is a disadvantage in that the battery structure becomes complicated.

In this case, the direction extended outside by being connected to the metal mesh pattern formed on the exposed fuel electrode is designed to be an air electrode direction including oxygen, and therefore, materials stable under an oxidizing atmosphere need to be used as a material of the fuel electrode current collector. Herein, materials stable under an oxidizing atmosphere used as a material of the fuel electrode current collector are generally expensive precious metal series metals such as silver, gold and platinum.

However, the flat plate-shaped solid oxide fuel cell having a porous ceramic support according to the present specification collects a current of the fuel electrode in a direction supplying fuel instead of a direction supplying air, and therefore, relatively inexpensive materials such as nickel and copper may be used, and costs may be reduced.

The flat plate-shaped solid oxide fuel cell having a porous ceramic support according to the present specification does not have a current collecting structure between the electrolyte layer and the fuel electrode, and is capable of forming the electrolyte layer on the flat fuel electrode, and therefore, has an advantage in that stable gas sealing is obtained.

The flat plate-shaped solid oxide fuel cell having a porous ceramic support according to the present specification does not have a current collecting structure between the electrolyte layer and the fuel electrode, and is capable of forming the electrolyte layer on the flat fuel electrode, and therefore, has an advantage in that a high open circuit voltage is obtained.

The flat plate-shaped solid oxide fuel cell having a porous ceramic support manufactured according to the present specification has increased cell efficiency.

The flat plate-shaped solid oxide fuel cell having a porous ceramic support manufactured according to the present specification has high long-term stability due to stable gas sealing.

The present specification provides a cell module including the flat plate-shaped solid oxide fuel cell as a unit cell.

The cell module may include a stack including unit cells including the solid oxide fuel cells, and a separator provided between the unit cells; a fuel supplying unit supplying fuel to the stack; and an oxidizer supplying unit supplying an oxidizer to the stack.

The cell module may be specifically used as a power supply of household power generation and heating, stacks for regional power generation, electric vehicles, hybrid electric vehicles, plug-in hybrid electric vehicles or power storage devices.

Hereinafter, the present specification will be described in more detail with reference to examples. However, the following examples are for illustrative purposes only, and the scope of the present specification is not limited thereto.

EXAMPLE

A ceramic support prepared by powder pressing $MgAl_2O_4$ (10 wt % carbon black based on the total solid weight) was pre-sintered for 2 hours at 1200° C.

The pre-sintered ceramic support was dip coated on NiO-GDC (weight ratio of NiO:GDC=61:39) slurry to coat fuel electrode (functional layer) slurry on the whole surface of the pre-sintered ceramic support, and the result was pre-sintered for 2 hours at 1200° C.

The pre-sintered fuel electrode (functional layer) was dip coated on YSZ slurry to coat an electrolyte membrane on the whole surface of the pre-sintered fuel electrode (functional layer), and then the pre-sintered ceramic support, the pre-sintered fuel electrode (functional layer) and the electrolyte slurry was completely sintered at the same time for 3 hours at 1500° C.

On one surface of the completely sintered electrolyte layer, an air electrode was formed by hand printing an LSM paste (method of tape-masking an area excluding an effective area and coating by sliding with glass), and then the result was completely sintered at the same time for 2 hours at 1200° C.

The prepared unit cell was photographed from the air electrode side (left) and the fuel electrode side (right), and the pictures are shown in FIG. 5.

As shown in the picture on the right side of FIG. 5, the fuel electrode was provided while being extended in a direction opposite to a direction provided with the air electrode based on the ceramic support, and as a fuel electrode current collector, a platinum mesh and a platinum line connected to the platinum mesh were formed on the fuel electrode extended in a direction opposite to a direction provided with the air electrode based on the ceramic support.

In addition, as in the picture on the left side of FIG. 5, a platinum mesh and a platinum line connected to the platinum mesh were formed on the air electrode as an air electrode current collector.

The air electrode current collector and the fuel electrode current collector were sintered for 2 hours at 1000° C.

A unit cell was manufactured by installing 571 sealing material, a ceramic sealing material produced by Aremco, and curing the result for 2 hours or longer at approximately 100° C.

Comparative Example

A unit cell was manufactured in the same manner as in the example, except that, as in the structure of FIG. 2, the fuel electrode of the example was not extended to a surface opposite to a surface provided with the electrolyte layer and the fuel electrode was only provided between the porous ceramic support and the electrolyte layer, and the electrolyte layer was formed on a part of the center of one surface of the fuel electrode, and, as the fuel electrode current collector, a platinum mesh and a platinum line connected to the platinum mesh were formed on the same surface as the surface of the fuel electrode provided with the electrolyte layer.

The manufactured unit cell was photographed from the air electrode side and the picture is shown in FIG. 4.

Test Example 1

An open circuit voltage (OCV) of the example and the comparative example was measured depending on the temperature, and the results are shown in FIG. 6.

An OCV means a voltage difference in a state with no current flow (state not in operation). As the OCV value increases, cell performance tends to be superior, and factors affecting this OCV value the most are electrolyte stability and status of gas sealing. In other words, the OCV value is high when an electrolyte is sufficiently stably coated, and when reaction gases (fuel and air) are completely sealed and all electrochemically reacted without a combustion reaction, an OCV value close to a theoretical value is obtained. In the comparative example, the OCV was low since not all the gas sealing sites were covered by the electrolyte and gas was considered to be leaked near electrolyte/fuel electrode/fuel electrode current collection. In other words, the OCV value is inevitably low since complete gas sealing is difficult with an existing current collecting method.

Test Example 2

The unit cell manufactured in the example or the comparative example was heated to a target temperature (850° C.), and a current was gradually raised while supplying hydrogen to the fuel electrode and air to the air electrode. Voltage shift data were continuously collected, and an output was calculated at each temperature. For more detailed electrochemical analysis, an alternating current impedance test was combined, and through a polar coordinate chart (Nyquist plot) of impedance values obtained with frequencies of high to gradually low as an input signal, an electrochemical reaction at the corresponding frequency was inferred.

Performance of the coil cells manufactured in the example and the comparative example was measured, and the results are shown in FIG. 7.

FIG. 7 is an I-V-P curve generally showing fuel cell performance. In the comparative example of FIG. 6, gas sealing was not complete leading to a low OCV value, and accordingly, the performance was measured to be low of approximately ½. When fuel electrode current collecting is carried out in a fuel supplying direction as in the example, the whole surface may be covered with an electrolyte, and gas sealing is readily achieved and a high OCV value may be expected, and ultimately, high performance is exhibited.

The invention claimed is:

1. A flat plate-shaped solid oxide fuel cell comprising:
   a porous ceramic support;
   a fuel electrode provided on the porous ceramic support;
   an electrolyte layer provided on the fuel electrode;
   an air electrode provided on the electrolyte layer; and
   a fuel electrode current collector connected to the fuel electrode and extending in a direction away from the air electrode.

2. The flat plate-shaped solid oxide fuel cell of claim 1, wherein at least a part of an edge part of the fuel electrode extends to a surface of the porous ceramic support in the direction away from the air electrode, and
   wherein the fuel electrode current collector and the part of the fuel electrode extending to the surface of the porous ceramic support in the direction away from the air electrode are connected.

3. The flat plate-shaped solid oxide fuel cell of claim 1, further comprising an air electrode current collector connected to the air electrode and extending in a direction away from the electrolyte layer.

4. The flat plate-shaped solid oxide fuel cell of claim 1, wherein the porous ceramic support includes at least one oxide of Mg, Ca, Y, Al and Zr.

5. The flat plate-shaped solid oxide fuel cell of claim 1, wherein the porous ceramic support includes at least one oxide of MgO, MgAl$_2$O$_4$, CaO, Y$_2$O$_3$, Al$_2$O$_3$ and Zr$_2$O$_3$.

6. The flat plate-shaped solid oxide fuel cell of claim 1, wherein a thickness of the porous ceramic support is 200 μm or more and 5 mm or less.

7. The flat plate-shaped solid oxide fuel cell of claim 1, comprising:
   a metal mesh layer provided on a part of the fuel electrode extending to a surface of the porous ceramic support in the direction away from the air electrode; and
   an extension line connected to the metal mesh layer and extending in the direction away from the air electrode.

8. The flat plate-shaped solid oxide fuel cell of claim 1, wherein the fuel electrode current collector includes nickel or copper.

9. A cell module comprising the flat plate-shaped solid oxide fuel claim 1 as a unit cell.

* * * * *